US007422789B2

(12) United States Patent
Avakian et al.

(10) Patent No.: US 7,422,789 B2
(45) Date of Patent: Sep. 9, 2008

(54) CATHODIC PROTECTION COATINGS CONTAINING CARBONACEOUS CONDUCTIVE MEDIA

(75) Inventors: Roger W. Avakian, Aurora, OH (US); Stephen D. Horton, Avon Lake, OH (US); John H. Hornickel, Medina, OH (US)

(73) Assignee: Polyone Corporation, Avon Lake, OH (US)

( * ) Notice: Subject to any disclaimer, the term of this patent is extended or adjusted under 35 U.S.C. 154(b) by 0 days.

(21) Appl. No.: 10/595,354

(22) PCT Filed: Oct. 22, 2004

(86) PCT No.: PCT/US2004/035250

§ 371 (c)(1), (2), (4) Date: Apr. 12, 2006

(87) PCT Pub. No.: WO2005/044928

PCT Pub. Date: May 19, 2005

(65) Prior Publication Data

US 2007/0111015 A1    May 17, 2007

Related U.S. Application Data

(60) Provisional application No. 60/514,691, filed on Oct. 27, 2003.

(51) Int. Cl.
  *B32B 15/08* (2006.01)
  *B32B 15/18* (2006.01)
  *B32B 27/18* (2006.01)
  *C23F 13/00* (2006.01)

(52) U.S. Cl. .......... 428/328; 428/343; 428/364; 428/367; 428/375; 428/378; 428/379; 428/403; 428/457; 205/687; 205/704; 205/724; 205/730; 205/731; 205/735; 205/736; 205/741; 524/495; 524/439; 524/440

(58) Field of Classification Search .................. None
  See application file for complete search history.

(56) References Cited

U.S. PATENT DOCUMENTS 4,474,685 A * 10/1984 Annis .................. 252/503

(Continued)

FOREIGN PATENT DOCUMENTS

JP    2005-68278    3/2005

OTHER PUBLICATIONS

Collins et al., "Carbon Nanotubes: A High Performance Conductive Additive" (Hyperion Catalysis International, Apr. 11, 2002).

(Continued)

*Primary Examiner*—Vivian Chen
(74) *Attorney, Agent, or Firm*—John H. Hornickel

(57) ABSTRACT

A cathodic protection polymeric compound is disclosed. The compound has flowable material to serve as a binder, carbonaceous conductive media dispersed in the flowable material, sacrificial metal particles also dispersed in the flowable material. The carbonaceous conductive media serve as a carbon-based electron transfer agent and are in the form of particles, platelets, fibers, tubes, or combinations thereof. A galvanic circuit is formed by the metal particles serving as anodes, a metal substrate to be protected serving as the cathode, and the conductive media serving as the electron transfer agent. The flowable material can also include an ionically conductive or an inherently conductive polymer to further enhance the galvanic circuit.

19 Claims, 1 Drawing Sheet

U.S. PATENT DOCUMENTS

| | | | |
|---|---|---|---|
| 4,490,282 A * | 12/1984 | Corboy et al. | 252/503 |
| 4,545,926 A * | 10/1985 | Fouts et al. | 252/511 |
| 4,786,383 A | 11/1988 | Houle | |
| 4,836,768 A | 6/1989 | Wilson et al. | |
| 4,880,517 A * | 11/1989 | Bennett et al. | 204/196.36 |
| 4,957,612 A | 9/1990 | Stewart et al. | |
| 5,069,822 A * | 12/1991 | Callaghan et al. | 252/511 |
| 5,098,771 A | 3/1992 | Friend | |
| 5,167,785 A | 12/1992 | McCready | |
| 5,183,694 A | 2/1993 | Webb | |
| 5,284,888 A * | 2/1994 | Morgan | 524/93 |
| 5,286,415 A | 2/1994 | Buckley et al. | |
| 5,292,411 A | 3/1994 | Bartholomew et al. | |
| 5,336,303 A * | 8/1994 | Cocks | 106/14.05 |
| 5,364,511 A * | 11/1994 | Moreland et al. | 204/196.3 |
| 5,378,335 A * | 1/1995 | Hoppe-Hoffler et al. | 204/501 |
| 5,643,670 A | 7/1997 | Chung | |
| 5,650,060 A * | 7/1997 | Huang et al. | 205/730 |
| 5,677,367 A * | 10/1997 | Savin | 523/219 |
| 5,700,398 A | 12/1997 | Angelopoulos et al. | |
| 5,908,585 A | 6/1999 | Shibuta | |
| 5,976,419 A * | 11/1999 | Hawkins et al. | 252/512 |
| 6,176,907 B1 * | 1/2001 | Glausch | 106/14.44 |
| 6,183,714 B1 | 2/2001 | Smalley et al. | |
| 6,184,280 B1 | 2/2001 | Shibuta | |
| 6,224,943 B1 | 5/2001 | Knepper et al. | |
| 6,248,478 B1 | 6/2001 | Friend et al. | |
| 6,287,372 B1 | 9/2001 | Briand et al. | |
| 6,402,933 B1 * | 6/2002 | Dowling | 205/725 |
| 6,524,466 B1 | 2/2003 | Bonaventura et al. | |
| 6,762,237 B2 | 7/2004 | Glatkowski et al. | |
| 6,893,687 B2 * | 5/2005 | Maurus | 427/508 |
| 7,074,348 B2 | 7/2006 | Geer et al. | |
| 2003/0175541 A1 * | 9/2003 | Lorenz et al. | 428/546 |
| 2003/0235711 A1 * | 12/2003 | Seido et al. | 428/660 |
| 2004/0005478 A1 | 1/2004 | Kendig et al. | |
| 2005/0224764 A1 | 10/2005 | Ma et al. | |
| 2007/0289879 A1 * | 12/2007 | Horton | 205/724 |

OTHER PUBLICATIONS

Baughman et al., "Carbon Nanotubes—the Route Toward Applications" Science vol. 297 pp. 787-792 (Aug. 2, 2002).

* cited by examiner

CATHODIC PROTECTION COATINGS CONTAINING CARBONACEOUS CONDUCTIVE MEDIA

CLAIM OF PRIORITY

This application claims priority from U.S. Provisional Patent Application Ser. No. 60/514,691 filed on Oct. 27, 2003.

FIELD OF THE INVENTION

This application relates to use of carbon-based electron transfer agents in cathodic protection coatings.

BACKGROUND OF THE INVENTION

In modern society, over the past fifty years, there has been a shift from metals to polymers, partly because the latter do not oxidize in the environment. For example, corrosion of metal destroys valuable property. Corrosion is the inevitable reaction of metal to form metal oxide when the metal is exposed to environmental conditions that permit such corrosion. Billions of dollars are spent each year to repair or replace metallic structures because of such corrosion.

The corrosion of iron-containing articles, the natural process normally called "rusting", has prompted considerable effort to find effective, economical ways to prevent or reduce rust. Coating the surface of the iron-containing article, the process of painting, was first attempted to shield the article from the elements needed for the natural rusting reaction to begin.

Iron-containing articles form the structures that have erected the cities and commercial links between them. Ironwork, for such diverse uses as multi-story buildings, suspension bridges, tunnels beneath a mountain or a river, high tension utility powerlines, fuel storage tanks, the Statue of Liberty, the Eiffel Tower, and reinforcement grids for concrete structures of all types, all require such protection from corrosion.

Anti-corrosion mechanisms have taken advantage of the Galvanic Series, whereby a less noble metal is a sacrificed in the environment where the iron would otherwise rust. This "cathodic protection" of metal has spawned an enormous industry dedicated to preserving metallic property against the ravages of the environment.

Cathodic protection utilizes the physics of a galvanic circuit, which can be assisted by power to be an active circuit to drive the corroding effects away from the metal being protected or which can be passive without power. Examples of passive galvanic circuitry are disclosed in U.S. Pat. No. 5,650,060 (Huang et al.) for an electrode-based system and in U.S. Pat. No. 5,976,419 (Hawkins et al.) for a coating-based system. Both types of systems rely on a more anodic metal in the Galvanic Series, such as zinc, to protect the more valuable iron in the structure. In the Huang et al. electrode, the zinc is in the form of plate adhered by an ionically conductive adhesive to a structure. In the Hawkins et al. coating, the zinc is in the form of particles dispersed in the binder and inherently conductive polymer. In both cases, the zinc is the anode of the galvanic circuit. The anodic zinc is sacrificed to preserve the cathodic iron.

U.S. Pat. No. 5,700,398 (Angelopoulos et al.) discloses a polymeric matrix with a conductive filler comprising conductive particles and an inherently conductive polymer which are useful for corrosion protection layers for metal substrates and other purposes.

U.S. Pat. No. 5,098,771 (Friend) discloses a fibril filled electrically conductive composite that can form a coating of sufficient electrical conductivity to be used in combination with sacrificial anode materials on the exposed surface of a metal or molded plastic part to help prevent corrosion.

U.S. Published Patent Application 20030122111 (Glatkowski) discloses an electrically conductive film having a plurality of nanotubes and optionally an additional conductive material.

SUMMARY OF THE INVENTION

What the art needs is a means to provide effective cathodic protection of metal substrates at reasonable cost by having a single coating contain both a carbonaceous conductive medium and sacrificial metal particles.

The present invention solves this problem in the art by concentrating on the conductive medium of the cathodic protection system.

"Conductive medium" or its plural, "Conductive media", means a carbonaceous material that exhibits electrical conductivity. The conductive medium is electrically active but galvanically inactive. Optionally, the carbonaceous material also can exhibit thermal conductivity.

Electrical conductivity of the cathodic protection system is achieved by the conductive media serving as additives to a flowable material. The conductive media are carbon-based electron transfer agents. The flowable material is also filled with sacrificial metal particles to complete a Galvanic circuit within the film or coating. Optionally, the flowable material also includes an inherently conductive polymer to enhance electrical conductivity.

"Carbon-based electron transfer agent" means solid carbonaceous material in the form of particles, platelets, fibers, tubes, and the like, and combinations thereof. The tubes can be multiple-walled nanotubes or single-walled nanotubes. Optionally, the carbonaceous material can be functionalized to become galvanically active and serve as sites for the sacrificial metal particles. Optionally, the carbonaceous material can be functionalized to become more electrically conductive via bonding with inherently conductive polymers.

"Flowable material" can be (a) a film-forming liquid, such as a paint or other coating, to be sprayed or brushed on to a metal-containing article needing cathodic protection;

(b) an amorphous solid, such as a polymeric adhesive or other polymer, to be formed as a layer on the metal-containing article; or (c) a vapor, such as a superheated gas that coalesces on the metal-containing article.

Preferably, the flowable material is a polymeric binder capable of rapidly and inexpensively forming a film or other coating on the metal-containing article to be cathodically protected. The flowable material need not itself be electrically conductive if the selection of flowable material is made less expensive as a result.

More preferably, the flowable material is capable of forming a barrier in the same manner as any paint or other coating does to provide a physical aspect of protection of the metal-containing article to be cathodically protected.

Thus, one aspect of the present invention is a cathodic protection polymeric compound, comprising: flowable material, carbonaceous conductive media dispersed in the flowable material, and sacrificial metal particles also dispersed in the flowable material.

It is within the scope of the present invention that the carbonaceous conductive medium can be discontinuous, continuous or co-continuous with the flowable material.

An advantage of the present invention is that carbonaceous material, preferably vanishingly small in size, can be used to impart electrical conductivity to a flowable material that also contains sacrificial metal particles, in order to make a cost-effective cathodic protection system.

Other advantages of the invention will be identified in the description of the embodiments of the invention in conjunction with the images constituting the drawings.

EMBODIMENTS OF THE INVENTION

Metal Particles

Figure 1:
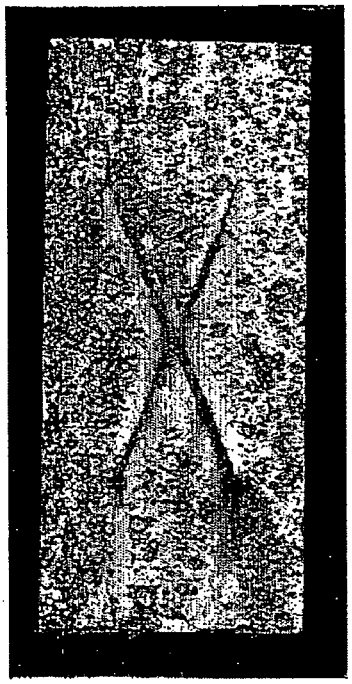
FIG. 1 is a digital image of a sample of Comparative Example A.

If the metal particles are to protect some other metal which is in electrical communication with the cathodic protection film or coating, then the metal chosen to be generated needs to be more anodic that the metal to be protected, according to the Galvanic Series. Such concept is disclosed in U.S. Pat. No. 5,976,419 (Hawkins et al.).

Average particle size can range from about 1 µm to about 25 µm, and preferably from about 2 to about 10 µm, and most preferably about 2 µm.

Metal particle shape is also a parameter. Particle shapes can range from spheres to platelets. Generally, the larger surface area per unit volume is preferable. However, one skilled in the art must also take into consideration the difficulties of processing high aspect ratio platelets compared with low aspect ratio spheres.

While not preferred, particles of metal can aggregate or agglomerate within the polymer, without departing from the scope of the present invention.

The sacrificial anodic metal particles reside in the flowable material, preferably intimately intermixed in, or co-continuous with, a flowable material that can be easily made contiguous to the cathodic metal to be protected.

The selection of the sacrificial anode is determined by the cathodic metal to be protected and then influenced by cost, availability, ease of handling, environmental impact, and other factors. The determination of metal candidates is founded in the Galvanic Series, which establishes the continuum of metallic performance. So long as the anode metal is higher or more anodic within the Galvanic Series than the cathodic metal, then it is a candidate.

The Galvanic Series is well-known to electro-chemists and can be employed without undue experimentation to select a suitable candidate for sacrificial anodic use. One location to examine the choices of candidates is www.corrosionsource.com. Another location based on Military Specifications is www.eaa1000.av.org/technicl/corrosion/galvanic.htm which identifies alloys of metals as well as pure metals in the Corrosion Control—Galvanic Table.

Non-limiting examples of common sacrificial anodes relative to cathodic metals to be protected are seen in Table 1.

TABLE 1

| Cathodic Metal to be Protected | Sacrificial Anodic Metal |
|---|---|
| Iron | Zinc, Aluminum, Tin |
| Copper | Iron + Those to Protect Iron |
| Nickel | Copper + Those to Protect Copper |
| Titanium | Nickel + Those to Protect Nickel |
| Silver | Titanium + Those to Protect Titanium |

Of the various possible metals, transition metals are preferred because such metals have low ionization energies, positive oxidation states, high melting points, high boiling points, high electrical conductivity, malleability, and other desirable properties.

The amount of anodic metal within the polymer can range from about 0.1% to about 95%, and preferably from about 5% to about 40%. All percents are weight percents to the total solids of the flowable material. The amount of anodic metal to be included should exceed the anticipated duration of galvanic protection, taking into account the rate of consumption of the metal as the sacrificial anode. It is possible for one skilled in the art to make computations to determine a preferred amount of anodic metal loading into the flowable material.

Metal particles can be any element less noble than the metal to be protected. Preferably, the metal particles are zinc because of lower cost than other metals and because zinc is less noble than iron, the metal most often protected by cathodic protection systems. Alternatively, one can use aluminum in circumstances where there is concern about the use of zinc in the environment. As the Military Specification Galvanic Table indicates, there are many suitable alloys of aluminum and another metal suitable for corrosion control.

Zinc particles are commercially available from such sources as Purity Zinc Metals LLC of Clarksville, Tenn.; Humel Croton, Inc.; and Trident Alloys, Ltd. Aluminum particles are commercially available from Eckart, Inc.

Flowable Material

The flowable material can be electrically active or inactive. An electrically inactive flowable material is more cost effective with electrically conductive media of the present invention. However, it may be desirable in some embodiments to assist the conductive media by having the flowable material to also be electrically active to improve electron transfer in the galvanic circuit in which the metal substrate to be protected is the cathode and the metal particles intermixed with the conductive media in the flowable material are the sacrificial anodes.

Non-limiting examples of electrically inactive flowable materials are any polymer capable of forming a film or coating or a molded or extruded product, such as polymers from olefins, acrylics, epoxies, urethanes, alkyds, uv-curable or electron-beam curable acrylates, polyvinyl chloride, polyester, polyvinyl alcohol, ethylene vinyl acetate, ionomers of ethylene acrylic acid, fluoropolymers, polymers of silicone, phenolic resins, melamine, polyamide, natural and synthetic rubbers, styrenic block copolymers, polystyrene sulfonic acid, polyacrylamide, polyvinyloxazoline, and polyethylenimine.

"Polymers" means naturally-occurring polymers, synthetically-produced polymers, combinations of naturally-occurring polymers and synthetically-produced polymers by physical or chemical interaction, or combinations thereof.

All principal forms of polymer physics are acceptable for use in the present invention: thermoplastic plastics, thermoplastic elastomers, thermoset plastics, thermoset elastomers, and the mixtures of them within such four corners of polymer physics. Thermoplastics are preferred for ease of formulation and application, but thermoset plastics are preferred for performance results. A non-limiting list of acceptable polymer chemistries can be found at www.PolyOne.com.

The polymer can be adhesive or non-adhesive. Its adhesiveness can be naturally occurring or generated by plasticizing and tackifying agents. A non-limiting list of acceptable adhesives can be found at www.3M.com.

The common denominator to the choice of polymer is that it be capable of serving as a binder or carrier for the combination of conductive media and metal particles therein.

Commercially available thermoplastic and thermoset polymers include commercial paints and other film-forming compounds, including without limitation, Valspar® brand paints and coating from Valspar of Minneapolis, Minn. USA; products of Sherwin-Williams of Cleveland, Ohio USA, and Rustoleum® brand paints and coatings from RPM Industries of Medina, Ohio USA.

Electrically active flowable materials are also suitable in the present invention.

In one embodiment, the electrically active polymer with metal particles and conductive media therein is a dispersed phase within a continuous phase of flowable material. The dispersed polymer is analogous to gel particles as identified in U.S. Pat. No. 5,270,358 (Asmus). Alternatively, the polymer with metal particles and conductive media therein can be introduced into a latex of the flowable material in water. Thus, a corrosion protection paint can be formed wherein the polymer/conductive media/metal particles phase has sufficient concentration to provide conduits of conductivity for protection of a metal substrate, once the water or other solvent has been removed or evaporated.

In another embodiment, the polymer with metal particles and conductive media therein and a second flowable material are co-continuous, whether in the form of an interpenetrating network, a bicontinuous structure, or the like, such as a polymerized microemulsion pressure sensitive adhesive disclosed in U.S. Pat. No. 5,670,557 (Dietz et al.), with the polymer with metal particles and conductive media therein qualifying as a continuous polymer phase.

Conductive Medium

Therefore, any solid carbonaceous material that is capable of providing electron transfer is a potential candidate for use in this invention. As stated above, the carbon-based electron transfer agent takes the form of particles, platelets, fibers, tubes and the like, and combinations thereof.

In order for the conductive media to be particularly effective in electron transfer in an electrically inactive flowable material, the conductive media should have an aspect ratio ranging from about 1 to about 20,000, and preferably from about 100 to about 10,000.

To achieve such aspect ratios, preferred conductive media are elongate, having a length ranging from about 1 µm to about 10 mm, and preferably from about 1 µm to about 20 µm and a width or diameter ranging from about 0.5 nm to about 100 µm, and preferably from about 0.6 nm to about 10 µm.

Also, such conductive media should have resistivities ranging from about $1\times10^{-8}$ Ohm·cm to about $3\times10^{2}$ Ohm·cm, and preferably from about $1\times10^{-6}$ Ohm·cm to about $5\times10^{-1}$ Ohm·cm.

The carbonaceous conductive media can be present in an amount of from about 0.01 to about 10 weight percent of total solids of the flowable material.

Of possible candidates, carbon fibers and nanotubes are preferred because of their large aspect ratios in spite of their short lengths. For example, carbon fibers easily can have aspect ratios greater than 10:1 (L/W) and nanotubes can achieve such aspect ratios in spite of being an order of magnitude or more smaller in diameter than the carbon fibers.

If nanotubes are selected for use, single wall nanotubes are preferred to multiple-walled nanotubes.

Single-walled carbon nanotubes is an emerging technology that is preferred, such as those disclosed in U.S. patent Publication 20030075682 (Colbert et al.); PCT Patent Publications WO 97/09272, WO 98/05920, WO 00/17102, WO 00/17101, WO 01/30694, WO 02/016257, WO 00/26138, WO 02/02659, WO 02/064868, WO 03/004741, WO 01/49599, and WO 03/020638.

Commercially available sources of carbon fibers and nanotubes currently include the Panex® carbon fiber product line of Zoltek Corporation of St. Louis, Mo., the fibril multi-walled carbon nanotube product line of Hyperion Catalysis International of Cambridge, Mass., and the buckytube single-walled carbon nanotube product line of Carbon Nanotechnologies, Inc. of Houston, Tex.

Optional Functionalized Conductive Media

To improve the electron transfer within the passive galvanic circuit, one can alter the carbonaceous material to provide the sacrificial metal particles therein, thereon, or thereat. The technical literature teaches the plating of metals onto carbonaceous material, such as nanotubes. Similar techniques can be used with fibers, platelets, etc.

Examples of such literature include Ang et al., "Electroless Plating of Metals onto Carbon nanotubes Activated by a Single-Step Activation Method" *Chem. Mater.* 1999 11(8); 2115-2118; Choi et al., "Spontaneous Reduction of Metal Ions on the Sidewalls of Carbon Nanotubes" *J.Am.Chem.Soc.* 2002 124(31); 9058-9059; and Govindaraj et al., "Metal Nanowires and Intercalated Metal Layers in Single-Walled Carbon Nanotube Bundles" *Chem. Mater.* 2000 12(1); 202-205.

To improve the electron transfer within the passive galvanic circuit, one can also alter the carbonaceous material to functionalize its surface to bond inherently conductive polymer thereto. The technical literature teaches such functionalization. Examples of such literature include Lu et al., "Organic Functionalization of the Sidewalls of Carbon Nanotubes by Diels-Alder Reactions: A Theoretical Prediction" *Org. Lett.* 2002 4(24) 4313-4315 and Ying et al., "Functionalization of Carbon Nanotubes by Free Radicals" *Org. Lett.* 2003 5(9) 1471-1473.

Particularly preferred as an inherently conductive polymer is a substituted polyaniline such as disclosed in U.S. Pat. No. 5,968,417 (Visawanathan) and more particularly that marketed by PolyOne Corporation as Teslart™ inherently conductive polymers and previously by GeoTech Chemical Company LLC as Ligno-PANi™ polymer.

Regardless of the type of alteration of the carbonaceous material, it is feasible to perform such method either before mixing into the flowable material or after.

Optional Ionic Conductivity for Flowable Material

If desirable, the flowable material can be made ionically conductive to enhance the overall conductivity of the cathodic protection system. The conductive media and metal particles can be mixed into such ionically conductive flowable material.

Non-limiting examples of ionic conductivity for polymers that are not inherently conductive are found in the vast patent portfolio of 3M Innovative Properties Company, among other locations known to those skilled in the art. Such examples of ionically conductive polymers are generally concerned with biomedical electrodes where transport of an electrical signal from the mammalian body to an ionically conductive material, usually a pressure sensitive adhesive of acrylate polymer or copolymer and plasticizers and electrolyte, permits the signal to be transported to an electrically conductive element and eventually to a therapeutic or diagnostic electrical device.

Space in this application does not permit a complete recitation of the many types of ionically conductive pressure sensitive adhesive polymers. One skilled in the art is directed to the following U.S. patents: U.S. Pat. Nos. 4,352,359; 4,524,087; 4,539,996; 4,554,924; 4,848,348; 4,848,353; 5,012,810; 5,133,356; 5,215,087; 5,276,079; 5,338,490; 5,362,420; 5,385,679; 5,389,376; 5,409,966; 5,438,988; 5,489,624; 5,505,200; 5,506,059; 5,520,180; 5,536,446; 5,536,768; 5,650,060; 5,660,178; 5,660,892; 5,670,557; 5,674,561; 5,702,753; 5,730,126; 5,779,632; 5,797,902; 5,813,981; 5,836,942; 5,846,558; 5,853,750; 5,924,983; 5,947,961; and 5,952,398.

In an industrial environment where cathodic protection is desired, an especially preferred ionically conductive medium is disclosed in U.S. Pat. No. 5,650,060 identified in the list above.

The ionically conductive agent comprises an ionically conductive medium and, optionally, means for reducing passivation of metal subject to anodic dissolution.

The ionically conductive medium can be any medium that is capable of transporting ionic charges. The ionically conductive medium preferably is compliant, dimensionally stable, and capable of substantially contacting the surface of the metal to be protected or the structure within which the metal is embedded.

The ionically conductive agent serves as an interface between the anode and cathode of a galvanic circuit and inhibits formation of a passivation layer at the surface of metal particles in the flowable material. The cathode of the galvanic circuit is the metal to be protected; the anode of the galvanic circuit are the metal particles in the flowable material.

Nonlimiting examples of ionically conductive media are natural and synthetic elastomers such as rubbers and gums, hydrogels, and hydrophilic pressure sensitive adhesives.

Preferably, to provide both ionic conductivity and a compliant structure to the metal article to be protected, the ionically conductive medium of the present invention is a hydrogel.

Nonlimiting examples of hydrogel ionically conductive media for the present invention include polyacrylic acids, poly(meth)acrylic acids, polyalkylene oxides, polyvinyl alcohols, poly(N-vinyl lactams), polyacrylamides, poly(meth) acrylamides, and those gels comprising hydrocolloids and swelling agents disclosed in U.S. Pat. No. 5,270,358 (Asmus).

More preferably, the ionically conductive medium of the present invention can be a hydrophilic pressure sensitive adhesive that is ionically conductive. Nonlimiting examples of hydrophilic pressure sensitive adhesives are ionically conductive pressure sensitive adhesive compositions disclosed in U.S. Pat. Nos. 4,524,087; 4,539,996; 4,554,924; and 4,848, 353 (all Engel); 5,225,473 (Duan); 5,276,079 (Duan et al.); 5,536,446 (Uy et al.); and 5,952,398 (Dietz et al.); and adhesives disclosed in U.S. Pat. Nos. RE31,454 (Hymes); 4,391, 278 (Cahalan); 4,699,146 and 4,750,482 (both Sieverding); and 4,635,642.

The present invention can use a polymeric pressure sensitive adhesive prepared from acrylamido-2-methyl-propanesulfonic acid, in any salt form, ("AMPS"), commercially available from Lubrizol, Inc. of Wickliffe, Ohio or a N-vinyl-pyrrolidone/acrylic acid copolymer pressure sensitive adhesive disclosed in U.S. Pat. No. 4,848,353 (Engel).

Optionally, one can provide dimensional stability for the ionically conductive medium by providing a scrim or other reinforcement for the medium. Nonlimiting examples of scrims are disclosed as used in the formation of adhesives by a solventless process in the Engel patents disclosed above.

Also, optionally, one can enhance the ionic conductivity of the ionically conductive medium by adding amounts of electrolyte to the medium. Halide salts of alkali metals are preferred typically comprising less than about 10 weight percent of the medium. Again, the Engel patents, and the Duan patents disclose acceptable electrolytes for use in hydrophilic pressure sensitive adhesives. LiCl is particularly preferred as an electrolyte.

Also, optionally, but preferably, one can include an antipassivation agent, i.e., a means for reducing passivation, preferably a metal complexing agent that facilitates transfer of galvanically active metal ions from the metal to be sacrificed, toward the metal to be protected. Such complexing agents are commercially available but unexpectedly are useful in reducing passivation of the metal to be dissolved anodically.

These complexing agents inhibit the precipitation of galvanically active metal ions that otherwise would form a passivation layer about the metal particles in the flowable material. Formation of the passivation layer prematurely ceases the current of the galvanic circuit.

Complexing agents useful in the ionically conductive agent of the present invention are those complexing agents which are capable of intimately dispersing or otherwise dissolving into the ionically conductive medium in a manner that permits controlled transfer of galvanically active ions through the ionically conductive medium. Some complexing agents are of a suitable size that permits multiple complexing of multiple portions of the complexing agent with the same metallic ion. Other complexing agents provide a single complexing site for galvanically active metal ion.

The complexing agents can be selected from the group consisting of molecular complexing agents that are free for diffusion and polymeric complexing agents that remain in the ionically conductive medium.

Nonlimiting examples of molecular complexing agents are ethylenediamine tetraacetic acid and its salts (collectively "EDTA"), cyanide compounds such as NaCN and KCN, and thiocyanate compounds such as NaSCN and KSCN.

Nonlimiting examples of polymeric complexing agents are poly(vinyl amines), poly(allyl amines), poly(alkylene amines), poly(ethylenimine)("PEI"), poly(vinyl pyridines), poly(vinyl pyrroles), poly(N-vinyl lactams) and poly(alkylene oxides).

Of these complexing agents, PEI is presently preferred due to its commercial availability, its low cost, its complexing ability in a pH range compatible with the pH of reinforced concrete structures, its availability in an aqueous solution form, its nonreactivity with the preferred hydrophilic pressure sensitive adhesives used in the ionically conductive medium, and its electrochemical stability throughout completion of the galvanic circuit duration.

Complexing agents can be added to the ionically conductive medium in any effective weight percent to serve as a complexing agent for a dissolved metal, and desirably in a weight percent ranging from about 1 to about 15 weight percent of the ionically conductive medium. Preferably, such weight percent ranges from about 3 to about 6 weight percent.

As described above, the complexing agent reduces passivation of the sacrificial metal by stabilizing the metallic ions formed by the dissolution of the metal. Such stabilization includes both solubilizing of the metallic ions and the inhibition of the formation of a passivation layer at or near the surface of the sacrificial metal.

Optional Inherently Conductive Polymer in Flowable Material

To additionally enhance electron transfer, the flowable material can also include an inherently conductive polymer, such as polymers having repeating monomeric units of aniline, thiophene, pyrrole, phenyl mercaptan, and the like. Other inherently conductive polymers are selected from the group consisting of substituted and unsubstituted polyparaphenylenevinylenes, substituted and unsubstituted polyanilines, substituted and unsubstituted polyazines, substituted and unsubstituted polythiophenes, substituted and unsubstituted polyparaphenylenes, substituted and unsubstituted poly-p-phenylene sulfides, substituted and unsubstituted polyfuranes, substituted and unsubstituted polypyrroles, substituted and unsubstituted polyselenophene, substituted and unsubstituted polyacetylenes, mixtures thereof, and copolymers thereof. These conductive polymers are disclosed in a variety of patents, including U.S. Pat. Nos. 5,069,820 (Jen et al.); 5,160,457 (Elsenbaumer); 5,185,100 (Han et al.); 5,281,363 (Shacklette et al.); 5,378,403 (Shacklette); 5,422,423 (Shacklette et al.); 5,456,862 (Kwan-Yue et al.); 5,567,355 (Wessling et al.); 5,700,398 (Angelopoulos et al.) and 5,911,918 (Shacklette et al.). As described in these patents the inherently conductive polymer is often doped with an acid such as hydrochloric acid or p-toluene sulfonic acid.

Particularly preferred is a substituted polyaniline such as disclosed in U.S. Pat. No. 5,968,417 (Visawanathan) and more particularly that marketed by PolyOne Corporation as Teslart™ inherently conductive polymers and previously by GeoTech Chemical Company LLC as Ligno-PANi™ polymer. A polyaniline can also assist in control of corrosion by passivating a surface of the metal to be protected, adding to the barrier and cathodic protection functions of a coating or paint using compounds of the present invention.

Method of Making

Combining the various ingredients into the flowable material is straightforward to those of ordinary skill in the art. Care needs to be taken in dealing with metallic particles which can be explosive under certain circumstances.

In most instances, the dry ingredients are pre-blended together in proper proportions in order to facilitate proper proportions when mixed into the flowable material. Temperature of mixing is usually room temperature because a dispersion is desired, and a heat of solution is not required. Mixing speeds need to be adequate to assure thorough mixing, preferably using high speed cowels.

Order of addition can be carbon first, metal second into the flowable material; metal first, carbon second into the flowable material; or a pre-blend of carbon and metal for later mixing by the user with the flowable material. Cowels are not usually needed for dry-blending the carbon and metal into a concentrate additive.

Mixing speeds can range from about 200 to about 2000 rpm and preferably from about 500 to about 1200 rpm.

Usefulness of the Invention

Metal to be Protected

A galvanic circuit is formed in the present invention, with the metal to be protected serving as the cathode, the conductive media in the flowable material as the electron transfer agent, and the less-noble metal particles in the flowable material as the sacrificial anodes. Optionally, the flowable material can be rendered ionically conductive or contain inherently conductive polymers to enhance the amount of electron transfer in the flowable material.

The metal will be protected via this galvanic circuit, whether within a structure, on the outer surface of a structure, or any other location where the possible effects of corrosion of that valuable metal can breed. In the case of iron, whether exposed girders of a structure or reinforcement bars ("rebar") in concrete, the combination of moisture, oxygen, and an electrolyte such as salt, initiates natural corrosion. In the case of rebar, the corrosion begins whenever the water seeps into the concrete following air gaps to reach the rebar, because the concrete itself provides the electrolyte due to salts in the water used to form the concrete. As the rebar rusts, the pressure of that oxide formation further cracks the concrete, exposing more rebar to air and water. Therefore, the first component of the galvanic circuit is the metal to be protected, the cathode.

Many other iron-containing structures and buildings need cathodic protection. When the flowable material is a paint or coating, the application of the cathodic protection can be pigmented as desired and applied to protect the metal surface and well as enhance its appearance.

Non-limiting examples of metal to be protected are iron, steel, copper, and aluminum.

Method of Application

Thus, the galvanic circuit has both the conductive medium and the sacrificial anode metal particles within the same flowable material. The flowable material can then be applied into contiguity with the metal substrate to be protected.

Non-limiting examples of application include all conceivable painting and coating techniques, such as spray-painting, brush/roller-painting, knife-coating, solution cast, and combinations thereof. The method of application depends on the nature of the metal substrate, whether the substrate has a surface of planar, simple curvature, compound curvature, or more complex surface configuration.

All metallic structures can theoretically benefit from the advantages of the present invention. With the optional addition of colorants into the flowable material, one can create paints and other coatings which not only protect the metal substrate but also provide color to the metal substrate.

Other embodiments are found in the following examples.

EXAMPLES

Examples 1-3 and Comparative Examples A-C

The following ingredients in Table 1 were chosen for the experimentation, along with the order of addition and mixing conditions.

TABLE 1

| Ingredient | Purpose | Brand | Source | Order of Addition | Temp/Mix Speed at Time of Addition |
|---|---|---|---|---|---|
| Water-Based Acrylic | Carrier/Binder | Rustoleum ® 5281 (38% solids) | RPM Industries | First | Room Temp (RT) |

TABLE 1-continued

| Ingredient | Purpose | Brand | Source | Order of Addition | Temp/Mix Speed at Time of Addition |
|---|---|---|---|---|---|
| Primer ICP/Zinc Blend | Corrosion Prevention Additive | Catize ® DLPZ-1 | PolyOne | Second | RT/High Speed Cowels |
| 5 Micron Zinc (Zn) Powder | Sacrificial Metal/ Electron Donor | PZM Zinc Dust | Purity Zinc | Second or Pre-blended | RT/High Speed Cowels |
| Carbon Fiber | Electron Transfer | Thermocarb TC-300 | Conoco Phillips | Second Pre-Blended With Zn | RT/Pre-Blend With Zn |
| Multi-Wall Carbon Nanotubes (MWNT) | Electron Transfer | Pyrograf-I | Nano Graphite Materials, Inc. | Second Pre-Blended With Zn | RT/Pre-Blend With Zn |
| Single Wall Carbon Nanotubes (SWNT) | Electron Transfer | Buckytubes SWNT | Carbon Nano-Technologies Incorporated | Second Pre-Blended With Zn | RT/Pre-Blend With Zn |

Table 2 shows the amount in weight percent of the Examples and Comparative Examples.

TABLE 2

| Wt. % | Comp. Ex. A | Comp. Ex. B | Comp. Ex. C | 1 | 2 | 3 |
|---|---|---|---|---|---|---|
| Binder | 100.00 | 85.00 | 85.00 | 85.00 | 85.00 | 85.00 |
| ICP/Zn Blend | 0 | 0 | 15.00 | 0 | 0 | 0 |
| Zn Dust | 0 | 15.00 | 0 | 13.50 | 14.85 | 15.00 |
| C Fiber | 0 | 0 | 0 | 1.50 | 0 | 0 |
| MWNT | 0 | 0 | 0 | 0 | 0.15 | 0 |
| SWNT | 0 | 0 | 0 | 0 | 0 | 0.0375 |

Figure 2:
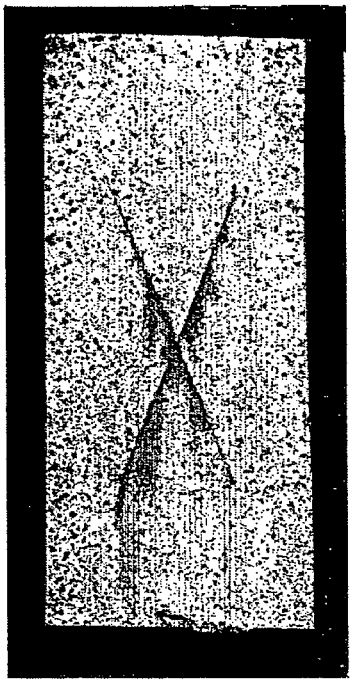
FIG. 2 is a digital image of a sample of Comparative Example B.
Figure 3:
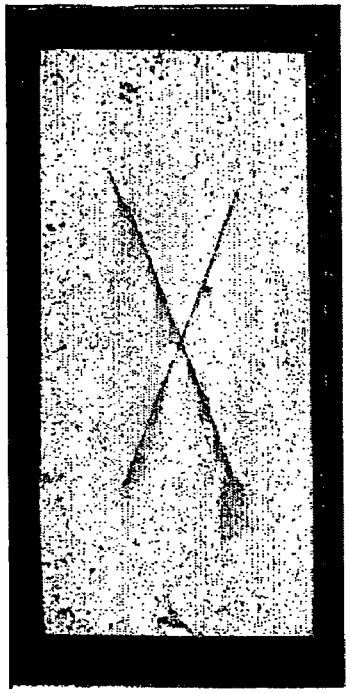
FIG. 3 is a digital image of a sample of Comparative Example C.
Figure 4:
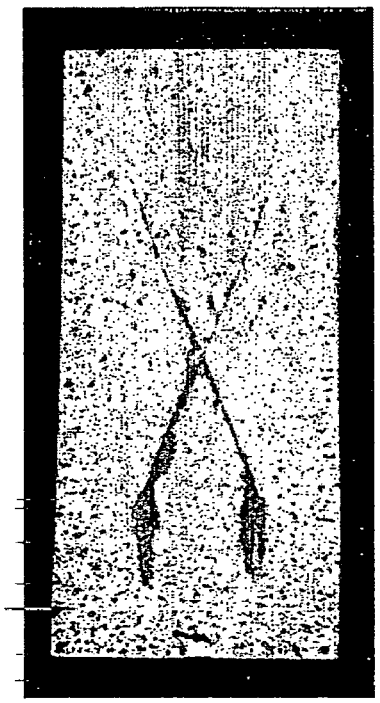
FIG. 4 is a digital image of a sample of Example 1.
Figure 5:
FIG. 5 is a digital image of a sample of Example 2.
Figure 6:
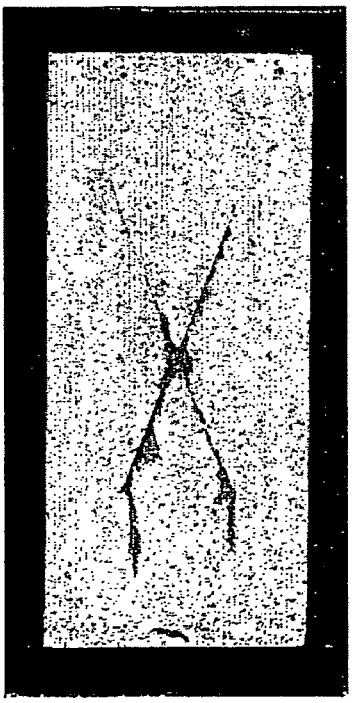
FIG. 6 is a digital image of a sample of Example 3.

Table 3 shows the testing method for the Comparative Examples A-C and the Examples 1-3 and the test results, corresponding to the FIGS. 1-6.

TABLE 3

| Test Method | ASTM No. | Temp. | Humidity | Duration | Substrate | Thick |
|---|---|---|---|---|---|---|
| Salt Spray | D117 | 35° C. +/− 1.6° C. | 100% | 250 hr. | Cold-Rolled Mild Steel | 0.066 mm +/− 0.01 mm |

| | Example | | | | | |
|---|---|---|---|---|---|---|
| | A | B | C | 1 | 2 | 3 |
| Scribe | 2.0 | 6.5 | 9.0 | 6.5 | 7.0 | 8.5 |
| Overall | 0.0 | 3.0 | 8.5 | 6.0 | 4.0 | 8.0 |
| Average | 1.0 | 4.75 | 8.75 | 6.25 | 5.50 | 8.25 |

| | FIG. | | | | | |
|---|---|---|---|---|---|---|
| | 1 | 2 | 3 | 4 | 5 | 6 |
| Improvement over Comp. Ex. A | — | 375% | 775% | 525% | 450% | 725% |
| Improvement over Comp. Ex. B | — | — | 84% | 31% | 15% | 73% |
| Improvement over Comp. Ex. C | — | — | — | −28% | −37% | −6% |

The present invention demonstrates considerable utility by comparing average values and percentage improvement over each of the Comparative Examples.

With a commercially available paint control (Comparative Example A), adding zinc dramatically improved resistance to salt spray corrosion, but nowhere near as successfully as using an ICP/Zn blend (Comparative Example C) or Zn/Carbon Fiber (Example 1) or Zn/MWNT (Example 2) or Zn/SWNT (Example 3).

When comparing against the Zn control (Comparative Example B), all of the Examples 1-3 improved performance by the addition of conductive media according to the present invention.

When comparing against the ICP/Zn Blend (Comparative Example C), the use Zn/SWNT (Example 3) is an acceptable substitute when considering cost of materials.

Prioritizing on the basis of cost, Example 1 provides significant performance improvement at a very small cost premium over that of Comparative Example A or Comparative Example B.

The numerical results are confirmed by visual examination of FIGS. 1-6.

The invention is not limited to the above embodiments. The claims follow.

What is claimed is:

1. A cathodic protection polymeric compound, comprising:
   (a) electrically inactive flowable material;
   (b) carbonaceous conductive media having an aspect ratio greater than 10:1 (L/W) and selected from the group consisting of carbon fibers, multiple-walled nanotubes, single-walled nanotubes, and combinations thereof dispersed in the flowable material in an amount sufficient to serve as an electron transfer agent in the electrically inactive flowable material; and
   (c) sacrificial metal particles also dispersed in the flowable material, wherein the sacrificial metal particles are less noble than a metal substrate to which the compound is intended to contact and wherein a combination of the metal substrate and the flowable material having the carbonaceous conductive media dispersed therein and the sacrificial metal particles dispersed therein is intended to form a passive galvanic circuit to protect the metal substrate by sacrifice of the sacrificial metal particles with the carbonaceous conductive media serving as the electronic transfer agent between the metal substrate and the sacrificial metal particles in the electrically inactive flowable material.

2. The compound of claim 1, wherein the carbonaceous conductive media are functionalized with plating of metal.

3. The compound of claim 1, wherein the carbonaceous conductive media are fibers.

4. The compound of claim 1 wherein the tubes are multiple-walled nanotubes.

5. The compound of claim 1, wherein the tubes are single-walled nanotubes.

6. The compound of claim 1, wherein the flowable material is polymeric binder and is capable of forming a film or coating upon removal of carrier from the flowable material.

7. The compound of claim 1, wherein the metal substrate is iron-containing and the sacrificial metal particles are zinc or aluminum.

8. The compound of claim 1, further comprising an ionically conductive agent in the flowable material.

9. The compound of claim 8, farther comprising a means for reducing passivation of the sacrificial metal particles.

10. The compound of claim 9, wherein the means is a complexing agent.

11. The compound of claim 1, further comprising an inherently conductive polymer in the flowable material.

12. A film formed from the compound of claim 1, wherein the film on the metal substrate completes a passive galvanic circuit in which the carbonaceous conductive media in the film serve as the electron transfer agent between the metal substrate and the sacrificial metal particles.

13. A metal substrate having a surface to which the compound of claim 1 is contacted wherein the passive galvanic circuit is formed from the metal substrate to the carbonaceous conductive media to the sacrificial metal particles to the carbonaceous conductive media to the metal substrate.

14. A method of protecting a metal substrate, comprising the step of contacting the compound of claim 1 with the metal substrate.

15. A method of using the compound of claim 1, comprising applying the compound of claim 1 to a metal substrate, wherein the compound and the metal substrate form a galvanic circuit in which the sacrificial metal particles are anodes and the metal substrate is a cathode and in which the carbonaceous conductive media serve as an electron transfer agent between the anodes and cathode.

16. The method of claim 15, wherein the galvanic circuit is passive.

17. A method of making the compound of claim 1, comprising the steps of mixing the carbonaceous conductive media into the flowable material and mixing the sacrificial metal particles into the flowable material.

18. The method of claim 17, wherein the carbonaceous conductive media are present in an amount of from about 0.01 to about 10 weight percent of total solids of the flowable material, and wherein the sacrificial metal particles are present in an amount of from about 0.1 to about 95 weight percent of the total solids of the flowable material.

19. A cathodic protection polymeric compound, comprising:
   (a) flowable material;
   (b) carbonaceous conductive media dispersed in the flowable material; and
   (c) sacrificial metal particles also dispersed in the flowable material, wherein the sacrificial metal particles are less noble than a metal substrate to which the compound is intended to contact, wherein the flowable material is a pressure sensitive adhesive.

* * * * *